May 27, 1924.

C. LONGUE

WEIGHING SCALE OF PRECISION

Filed Aug. 25, 1922

1,495,559

Inventor:
C. Longue
By
Langner, Parry, Card & Langner
Attys.

Patented May 27, 1924.

1,495,559

UNITED STATES PATENT OFFICE.

CAMILLE LONGUE, OF PARIS, FRANCE.

WEIGHING SCALE OF PRECISION.

Application filed August 25, 1922. Serial No. 584,337.

*To all whom it may concern:*

Be it known that I, CAMILLE LONGUE, a citizen of the French Republic, residing 8 Boulevard Edgard Quinet, Paris, France, have invented new and useful Improvements in Weighing Scales of Precision, of which the following is the specification.

This invention relates to improvements in weighing scales of precision and more particularly to aperiodic micrometric weighing scales.

A first feature of the invention consists in that the load on the ends of the beam is applied at two points by means of an intermediate member carrying a continuous or discontinuous knife edge and such that the vertical plane passing through this knife edge encounters the straight line joining the two points of application on the beam between these two points.

The invention is moreover characterized in that the weighing scale is provided with an air shock-absorber constituted by one or more plane or curved surfaces of any shape whatever moving within a fixed cylinder and in the side surface or bottom in which are provided openings which can be opened or closed at will.

Finally the beam is provided, above the central knife edge, with a pointer carrying the micrometer.

The accompanying drawing shows, by way of example, a form of the construction of the invention.

Figure 1:
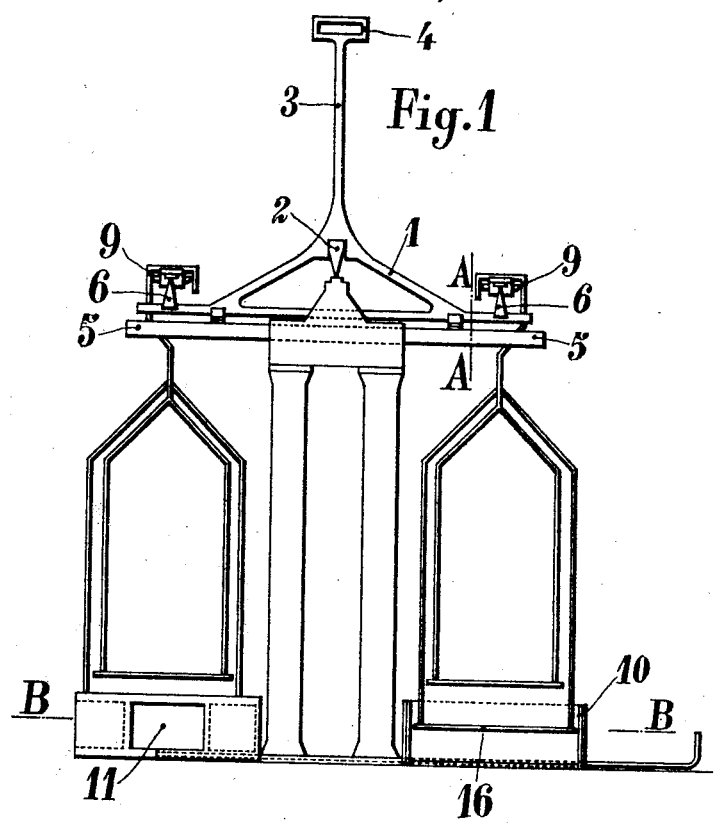
Fig. 1 is an elevation, partly in section, of a weighing scale constructed in accordance with the invention.
Figure 2:
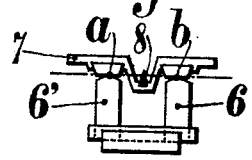
Fig. 2 is a sectional side view according to line A—A of Fig. 1.

The beam 1 of the weighing scale carries a central knife edge 2 and above the latter a pointer 3 carrying the micrometer 4.

Each of the ends of the beam, and for instance the end 5, carries, in the example shown, two knife edges 6 and 6'. On the knife edges 6 and 6' rests at two points $a$ and $b$ and intermediate member 7 which carries a knife edge 8 substantially at right angles to the straight line $a$—$b$.

Preferably, the straight line $a$—$b$ and the knife edge 8 meet at a point situated between the knife edges 6 and 6', but the knife edge 8 can also be situated above or below the straight line $a$—$b$ and, in this case, the vertical plane passing through the knife edge 8 encounters the straight line $a$—$b$ at a point situated between the knife edges 6 and 6'.

Figure 3:
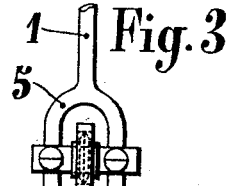
Fig. 3 is a plan view corresponding to Fig. 2.
Figure 4:
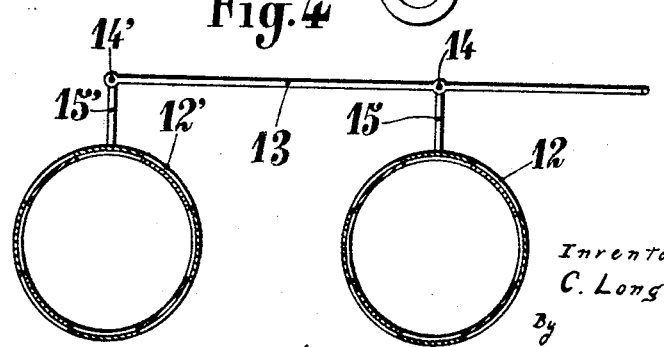
Fig. 4 is a diagrammatic sectional plan view made according to line B—B of Fig. 1.

On the knife edge 8 rests an open or close yoke 9, the plane of which is substantially parallel to the plane of the beam and, preferably, coincides with the same. For permitting the passage of this yoke 9, the end 5 of the beam 1 is conveniently in the shape of a ring, as illustrated in Fig. 3. On the other hand, the scale plates and the load are suspended from the yoke 9 by other joints.

The air shock-absorber is constituted by a plane or curved surface 16, of any shape whatever but without ledges, moving within a fixed cylinder 10; several stepped surfaces 16 may obviously be provided. The cylinder 10 has side openings 11 for instance, which can be more or less obturated by means of cylindrical shutters 12 and 12'; these shutters can be simultaneously operated by means of a control link 13 pivoted at 14 and 14' on the rods 15 and 15' integral with the shutters 12 and 12'.

With these side openings or with bottom openings is it possible, on the one hand, to vary the damping of the oscillations and, on the other hand, to put in communication the interior of the cylinder with the exterior of the cage for the balancing of all the physical variables of the media in communication.

It is obvious that the modifications of details which may be made in the form of construction described enter in the scope of the invention, because they do not alter in any way its features or its operation.

What I claim as my invention and desire to secure by Letters Patent is:

1. In a weighing scale of precision, a beam, an intermediate member resting at two points at one end of the beam, a knife edge carried by the said member and such that the vertical plane passing through this knife edge is situated between the two points, a yoke resting on this knife edge, a plate suspended from the said yoke, the means of deadening the oscillations of the weighing scale.

2. In a weighing scale of precision, a beam, an intermediate member resting at two points at one end of the beam, a knife edge carried by the said member and such that the vertical plane passing through this knife edge is situated between the two points, a yoke resting on this knife edge, a plate suspended from the said yoke, a damping member also suspended from the yoke, a fixed cylinder slidably receiving the damping member, openings provided in the said cylinder, the means for varying the size of the said openings.

3. In a weighing scale of precision, a beam, an intermediate member resting at two points at one end of the beam, a knife edge carried by the said member and such that the vertical plane passing through this knife edge is situated between the two points, a yoke resting on this knife edge, a plate suspended from the said yoke, a damping member also suspended from the yoke, a fixed cylinder slidably receiving the damping member, side openings provided in the said cylinder an obturator surrounding the cylinder and capable of turning on the same, the means for causing to rotate together the obturators of the relative cylinders at each end of the beam.

4. In a weighing scale of precision, a beam, an intermediate member resting at two points at one end of the beam, a knife edge carried by the said member and such that the vertical plane passing through this knife edge is situated between the two points, a yoke resting on this knife edge, a plate suspended from the said yoke, a damping member also suspended from the yoke, a fixed cylinder slidably receiving the damping member, side openings provided in the said cylinder, an obturator surrounding the cylinder and capable of turning on the same, an arm integral with the obturator, a link connecting the arms of the obturators to each cylinder.

5. In a weighing scale of precision, a beam, an intermediate member resting at two points at one end of the beam, a knife edge carried by the said member and such that the vertical plane passing through this knife edge is situated between the two points, a yoke resting on this knife edge, a plate suspended from the said yoke, a damping member also suspended from the yoke, a fixed cylinder slidably receiving the damping member, side openings provided in the said cylinder, an obturator surrounding the cylinder and capable of turning on the same, an arm integral with the obturator, a link connecting the arms of the obturators to each cylinder, a pointer integral with the beam, a micrometer carried by the said pointer.

In testimony whereof I have signed my name to this specification.

CAMILLE LONGUE.